United States Patent
Kruglick (10) Patent No.: US 9,961,104 B2
(45) Date of Patent: May 1, 2018

(54) SIDE CHANNEL ATTACK DETERRENCE IN NETWORKS

(71) Applicant: Empire Technology Development LLC, Wilmington, DE (US)

(72) Inventor: Ezekiel Kruglick, Poway, CA (US)

(73) Assignee: EMPIRE TECHNOLOGY DEVELOPMENT LLC, Wilmington, DE (US)

(*) Notice: Subject to any disclaimer, the term of this patent is extended or adjusted under 35 U.S.C. 154(b) by 242 days.

(21) Appl. No.: 14/558,447

(22) Filed: Dec. 2, 2014

(65) Prior Publication Data
US 2016/0156561 A1    Jun. 2, 2016

(51) Int. Cl.
H04J 1/16  (2006.01)
H04L 29/06  (2006.01)

(52) U.S. Cl.
CPC .......... *H04L 63/1441* (2013.01); *H04L 63/20* (2013.01)

(58) Field of Classification Search
CPC ............................ H04L 63/1441; H04L 63/20
USPC ........................................................ 370/230
See application file for complete search history.

(56) References Cited

U.S. PATENT DOCUMENTS

| 842,484 A | 1/1907 | Merrill | |
|---|---|---|---|
| 2002/0145974 A1* | 10/2002 | Saidi | H04L 49/153 370/230 |
| 2007/0223459 A1* | 9/2007 | Crowle | H04J 3/0664 370/353 |
| 2010/0107162 A1* | 4/2010 | Edwards | G06F 9/5077 718/1 |
| 2014/0101305 A1* | 4/2014 | Kelley, Jr. | H04L 45/24 709/224 |
| 2015/0038074 A1* | 2/2015 | Buckley | H04B 5/0031 455/41.1 |

OTHER PUBLICATIONS

"Generic Routing Encapsulation," accessed at http://web.archive.org/web/20140404151114/http://en.wikipedia.org/wiki/Generic_Routing_Encapsulation, modified on (Jan. 21, 2014), pp. 7.
"Hurst exponent," accessed at http://web.archive.org/web/20140324180627/http://en.wikipedia.org/wiki/Hurst_exponent, modified on (Mar. 12, 2014), pp. 6.
"Network processor," accessed at http://web.archive.org/web/20130603200923/http://en.wikipedia.org/wiki/Network_processor, modified on (Feb. 28, 2013), pp. 5.
Alizadeh, M., et al., "Less is More: Trading a Little Bandwidth for Ultra-low Latency in the Data Center," In Proceedings of USENIX NSDI Conference, pp. 253-256, (2012).
Besag, J., "Spatial interaction and the statistical analysis of lattice systems," Statist. Soc. Ser. B, vol. 36, pp. 192-236, (1974).

(Continued)

*Primary Examiner* — Peter Cheng
(74) *Attorney, Agent, or Firm* — Dorsey & Whitney LLP (57) ABSTRACT

The present disclosure relates to technologies to deter side channel data center attacks. An example method may include receiving an incoming packets destined for a network, grouping, at a gateway, the incoming packets into groups, wherein a size of the groups is based on predetermined statistics, and wrapping the groups into packages of normalized size.

20 Claims, 7 Drawing Sheets

(56) References Cited

OTHER PUBLICATIONS

Bort, J., "Oracle Just Declared War on Cisco," accessed at http://www.businessinsider.com/oracle-cisco-software-defined-networking-2012-7?IR=T, posted on (Jul. 30, 2012), pp. 2.
Cáceres, R., et al., "Multicast-based inference of network-internal loss characteristics," IEEE Trans. Inform. Theory, vol. 45, pp. 2462-2480, (Nov. 1999).
Cao, J., "A scalable method for estimating network traffic matrices," Technical report, Bell Labs, pp. 1-9, (2000).
Cao, J., et al., "Time-varying network tomography: Router link data," Amer. Statist. Assoc., vol. 95, pp. 1063-1075, (Feb. 29, 2000).
Castro, R., "Network Tomography: Recent Developments," Statistical Science, vol. 19, No. 3, pp. 499-517, (Aug. 2004).
Clegg, R. G. "A Practical Guide to Measuring the Hurst Parameter," International Journal of Simulation: Systems, Science & Technology 7(2), pp. 43-55, (2006).
Darrow, B., "Oracle to buy Corente to bolster SDN," accessed at http://web.archive.org/web/20140307125901/http://gigaom.com/2014/01/07/oracle-to-buy-corente-to-bolster-sdn/, posted on (Jan. 7, 2014), pp. 3.
Heresy, N., "NVGRE, VXLAN and what Microsoft is Doing Right," accessed at http://web.archive.org/web/20140626203804/http://networkheresy.com/2011/10/03/nvgre-vlxan-and-what-microsoft-is-doing-right/, posted on (Oct. 3, 2011), pp. 4.
Heresy, N., "VXLAN: Moving Towards Network Virtualization," accessed at http://web.archive.org/web/20140319065240/http://networkheresy.com/2011/08/31/vxlan-moving-towards-network-virtualization/, posted on (Aug. 31, 2011), pp. 2.
Jackson, J., "VMware to Acquire Openflow Pioneer Nicira for $1.26 Billion," accessed at http://www.cio.com/article/2393876/mergers-acquisitions/vmware-to-acquire-openflow-pioneer-nicira-for--1-26-billion.html, posted on Jul. 23, 2012, pp. 2.
Kerner, S. M., "VMware Takes Aim at Software Defined Networking and OpenFlow," accessed at http://web.archive.org/web/20130903041751/http://www.internetnews.com/infra/vmware-takes-aim-at-software-defined-networking-and-openflow.html software-defined-networking-andopenflow.html, posted on (May 14, 2012), p. 1.
Levy, S., "Going With the Flow: Google's Secret Switch to the Next Wave of Networking," accessed at http://web.archive.org/web/20140531030420/http://www.wired.com/2012/04/going-with-the-flow-google/, posted on (Apr. 17, 2012), pp. 15.
Ling, Z., et al., "Novel Packet Size-Based Covert Channel Attacks Against Anonymizer," IEEE Transactions on Computers, vol. 62, No. 12, pp. 2411-2426, (Dec. 2013).
Mahalingam, M., et al., "VXLAN: A Framework for Overlaying Virtualized Layer 2 Networks over Layer 3 Networks," Network Working Group Internet Draft RFC-2119, pp. 1-20, (Aug. 26, 2011).
Razavi, "Verizon to Demonstrate Software Defined Networking Principles With Collaborative Lab Trials," accessed at http://web.archive.org/web/20131102080120/http://bizcloudnetwork.com/verizon-openflow, posted on (Apr. 17, 2012), pp. 3.
Slowe, "Some Thoughts and Questions About STT," accessed at http://web.archive.org/web/20140803112251/http://blog.scottlowe.org/2012/03/12/some-thoughts-and-questions-about-stt/, posted on (Mar. 12, 2012), pp. 12.
Sridharan, M., et al., "NVGRE: Network Virtualization using Generic Routing Encapsulation," Network Working Group Internet Draft RFC-2119, pp. 1-18, (Sep. 2011).
Vardi, Y., "Network Tomography: Estimating Source-Destination Traffic Intensities from Link Data," Journal of the American Statistical Association, vol. 91, issue No. 433, pp. 365-377, (Mar. 1996).
Bates, A. et al., "Let SDN Be Your Eyes: Secure Forensics in Data Center Networks", Workshop on Security of Emerging Networking Technologies, pp. 1-7 (Feb. 2014).
Cheng, X. et al., "Estimation of Network Traffic Hurst Parameter Using HHT and Wavelet Transform", 5th International Conference on Wireless Communications, Networking and Mobile Computing, pp. 1-4 (Sep. 24-26, 2009).
Khurshid, A. et al., "VeriFlow: Verifying Network-Wide Invariants in Real Time", Proceedings of the first workshop on Hot topics in software defined networks, pp. 49-54 (Aug. 13, 2012).
Nunes, B.A.A. et al., "A Survey of Software-Defined Networking: Past, Present, and Future of Programmable Networks", IEEE Communications Surveys & Tutorials, vol. 16, Issue 3, pp. 1617-1634 (Feb. 13, 2014).

\* cited by examiner

SIDE CHANNEL ATTACK DETERRENCE IN NETWORKS

BACKGROUND

Network virtualization is the process of combining hardware and software network resources into a single, software-based administrative entity as a virtualized network. Software defined networking is an example of network virtualization in which hardware network resources are decoupled from software network resources in order to simplify network management, and allow software developers to treat network hardware resources in the same manner that they treat storage and computer resources. Software defined networking allows network intelligence to be centralized in software-based controllers, thereby allowing network hardware devices to function as simple packet forwarders that can be programmed by way of an open interface.

Networks may be susceptible to covert attacks through side channel attack techniques. Side channel attacks are attacks on networks based on information gained from the physical implementation of the network.

SUMMARY

Techniques are generally described that include methods and apparatuses. An example method may include receiving a plurality of incoming packets destined for a network, for example a software defined network or virtualized network. The plurality of incoming packets may then be grouped into groups of packets. The sizes of the groups of packets may be based on predetermined statistical information. The groups of packets may then be wrapped into packages, where the packages are of a normalized size. The normalized size may be chosen in order to obscure packet size information, and may be based on a Gaussian distribution. The normalized size may also be selected such that the normalized size varies over time. The groups of packets may include multiple packets, split packets, false data, redundant data, or combinations thereof.

In some examples, an apparatus includes at least one processing unit and at least one non-transitory computer readable medium. The non-transitory computer readable medium may be encoded with instructions for causing the at least one processing unit to receive a plurality of incoming packets configured for routing by a network, aggregate certain packets of the incoming packets into groups, and wrap the groups into packages of a normalized size for distribution to destinations within the network. The plurality of incoming packets may comprise on or more of multiple packets, split packets, single packets, or false data. The normalized size may be determined in accordance with predetermined statistics. The predetermined statistics may vary over time or be adjusted based on a busyness of the network. Busyness may be defined as the amount and frequency of packets that travel over the network. The predetermined statistics may be adjusted from within a data center that hosts the network. The predetermined statistics may also be configured to change a distribution of the normalized size of the groups. The distribution of the normalized size may have a Gaussian profile. The predetermined statistics may also be selected to increase entropy in packet flow to the network. Entropy in packet flow may be defined as apparent complexity or randomness of the packet flow. The observable traffic on the network may include a normalized distribution of packages of wrapped packets where the packages are of a normalized size.

In some examples, an apparatus includes at least one processing unit and at least one computer readable medium encoded with executable instructions. The executable instructions may cause the at least one processing unit to unwrap on or more wrapped packages received at a virtual machine in a network. The wrapped packages may be distributed in a normalized distribution, and each wrapped package may be an aggregation of one or more packets. The apparatus may also include a virtual router associated with a hypervisor. The virtual router may be one of an authentication server and a transaction server.

In some examples, a method includes selecting a distribution of normalized sizes for distribution in a network, and receiving incoming packets at a gateway of the network. The method may also include grouping, at the gateway, the packets into groups of packets for a same destination, wherein the groups of packets are sized in accordance with the normalized sizes. The method may further include wrapping, at the gateway, the groups of packets into packages for transport to respective destinations. The distribution of normalized sizes may be a normalized distribution. The distribution of normalized sizes may be varied in accordance with a busyness of the network. The method may also include selecting the distribution of normalized sizes at a data center associated with the network.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several examples in accordance with the disclosure and are, therefore, not to be considered limiting of its scope, the disclosure will be described with additional specificity and detail through use of the accompanying drawings, in which:

all arranged in accordance with at least some embodiments of the present disclosure.

DETAILED DESCRIPTION

In the following detailed description, reference is made to the accompanying drawings, which form a part hereof. In the drawings, similar symbols typically identify similar components, unless context dictates otherwise. The illustrative examples described in the detailed description, drawings, and claims are not meant to be limiting. Other examples may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are implicitly contemplated herein.

This disclosure is drawn, inter alia, to methods, systems, products, devices, and/or apparatuses generally related to networks such as virtualized networks including, for example software defined networks. As previously discussed, networks may be susceptible to covert attacks through side channel attack techniques. Side channel attacks are attacks on networks based on information gained from the physical implementation of the network. This information may be based on parameters such as network traffic statistics, and may include, for example, packet timing, packet delays, congestion timing, the relation of such variables to known traffic, and the size of packets transmitted throughout the network. There are typically three steps in a side channel attack on a network. First, an attacker may systematically map out a data center hosting the network and may figure out how to get a task assigned in the vicinity of a target. Then the attacker determines whether the assigned task is colocated with the target. Finally, the side channel data is extracted by the colocated task and information regarding the network is acquired by the attacker. This information may allow the attacker, for example, to determine the amount of time it takes to perform security operations within the network and may therefore enable the attacker to determine the type of security utilized by the network. With this information, the attacker may then be able to break into the network. Because these side channel attacks are covert and may appear to an observer as regular network traffic, they may be difficult for a network administrator to detect.

An example of a method to deter side channel attacks in a network according to an embodiment of the present disclosure may include selecting a distribution of normalized sizes for distribution in the network and receiving incoming packets at a gateway of the network. The incoming packets may then be grouped at the gateway into groups of packets for a same destination, where the groups are sized according to the normalized sizes. The groups of packets may then be wrapped into packages for transport to respective destinations within the network.

Figure 1:
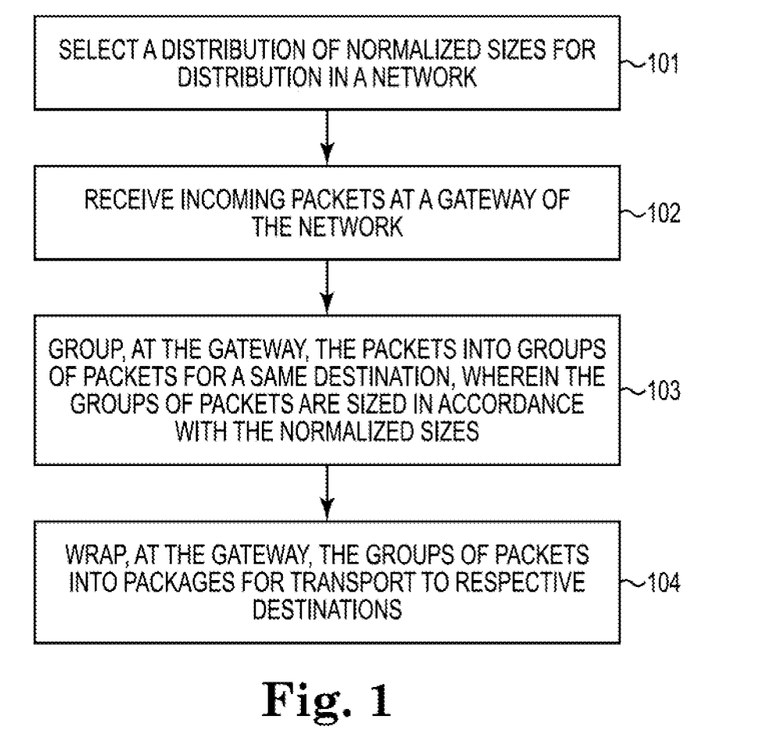
FIG. 1 is a flowchart illustrating an example method to deter a side channel attack in a network.

FIG. 1 is a flowchart illustrating an example method 100 to deter a side channel attack in a network, arranged in accordance with at least some embodiments of the present disclosure. The network may be a software defined network. Example method 100 may be implemented using, for example, any of the systems, such as a system 500 in FIG. 5, further described herein below. Example method 100 may include one or more operations, functions, or actions as illustrated by one or more of blocks 101, 102, 103, and/or 104. In some embodiments, the blocks in example method 100 may be performed by a computing device such as a computing device 600 in FIG. 6. The operations described in blocks 101-104 may also be stored as computer-executable instructions in a computer-readable medium such as a computer readable medium 706 as described in FIG. 7.

Example method 100 may begin with block 101 that recites "select a distribution of normalized sizes for distribution in a network." Block 101 may be followed by block 102 that recites "receive incoming packets at a gateway of the network." Block 102 may be followed by block 103 that recites "group, at the gateway, the packets into groups of packets for a same destination, wherein the groups of packets are sized in accordance with the normalized sizes." Block 103 may be followed by block 104, which recites "wrap, at the gateway, the groups of packets into packages for transport to respective destinations."

The blocks included in the described example methods are for illustration purposes. In some embodiments, the blocks may be performed in a different order. In some other embodiments, various blocks may be eliminated. In still other embodiments, various blocks may be divided into additional blocks, supplemented with other blocks, or combined together into fewer blocks. Other variations of these specific blocks are contemplated, including changes in the order of the blocks, changes in the content of the blocks being split or combined into other blocks, etc.

Figure 5:
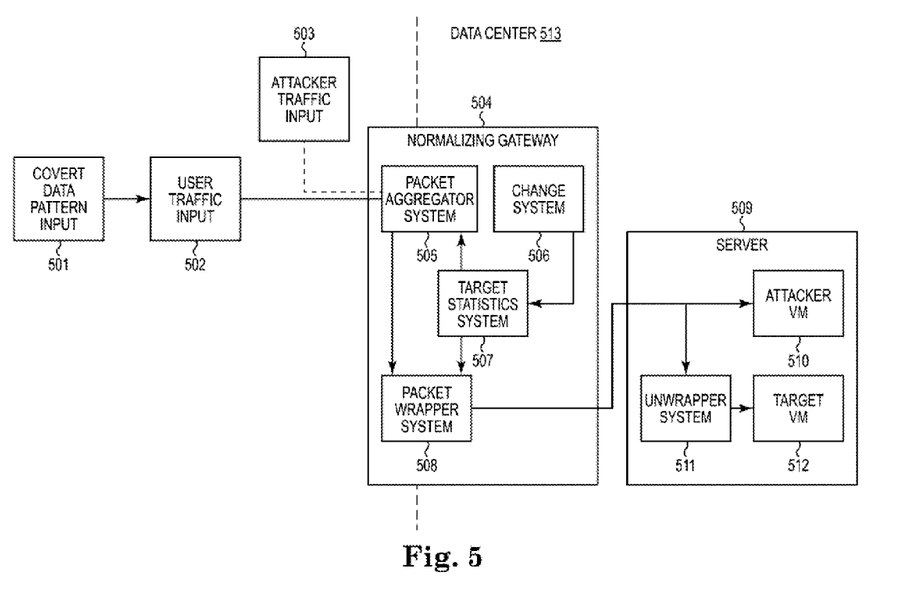
FIG. 5 illustrates an example system including a network with side channel attack deterrence.

At block 101, a target statistics system (for example, a target statistics system 507 in FIG. 5) may select a distribution of normalized sizes for distribution to destinations in a network (for example, an attacker VM 510 and a target VM 512 on a server 509 in FIG. 5). The network may be implemented, for example, through software-based controllers and network devices that may be programmed via an open interface, and may include virtual machines on a server (for example, attacker VM 510 and target VM 512 on server 509 in FIG. 5). The open interface may be, for example, ForCES, OpenFlow, or another suitable open interface. The distribution of normalized sizes may, for example, be based on the expected frequency or sizes of packets incoming for distribution in the network, or may be based on other statistics. The distribution of normalized sizes may, for example, have a Gaussian profile, or may have some other predetermined distribution profile.

At block 102, a gateway (for example, a normalizing gateway 504 in FIG. 5) may receive incoming packets directed to destinations within the network (for example, attacker VM 510 and target VM 512 on server 509 in FIG. 5). The incoming packets may be, for example, data associated with email, commerce, or financial transactions. The gateway of the network may be a gateway by which outside computers communicate with servers or hypervisors within a data center (for example, server 509 in a data center 513 in FIG. 5).

At block 103, a packet aggregator system at a gateway (for example, a packet aggregator system 505 at normalizing gateway 504 in FIG. 5) may group incoming packets into groups that have the same destination within the network. Packets may be held at the gateway and sorted by the intended destination of the packets for locations within the data center servers. These locations may include different virtual machines on a single server (for example, attacker VM 510 or target VM 512 on server 509 in FIG. 5), or multiple virtual machines on multiple servers. The packets may be grouped so that network traffic can be efficiently wrapped and routed in a fashion that will frustrate attempts to observe irregularities or patterns in network traffic. There may be multiple routing stops between the gateway and the final packet destinations, including core, aggregation, and edge data center routing stops.

At block 104, a packet wrapper system (for example, a packet wrapper system 508 in FIG. 5) may wrap groups of packets into packages for transport to destinations within the network. Wrapping may, for example, be implemented through packet encapsulation. Packet encapsulation is the process of wrapping a packet of data in another format, where the format includes metadata and virtual switch metadata relating to virtual machine (VM) destination addresses, for example, Transmission Control Protocol (TCP), Internet Protocol (IP), Layer 2 Tunneling Protocol (L2), and/or Stateless Transport Tunneling (STT). A virtual machine manager (VMM) or hypervisor may maintain a table associated with each VM destination that indicates which VM destination addresses should be sent or linked to which physical addresses via the wrapped packages. In some cases, the packet wrapping format may be another packet.

Figure 2:
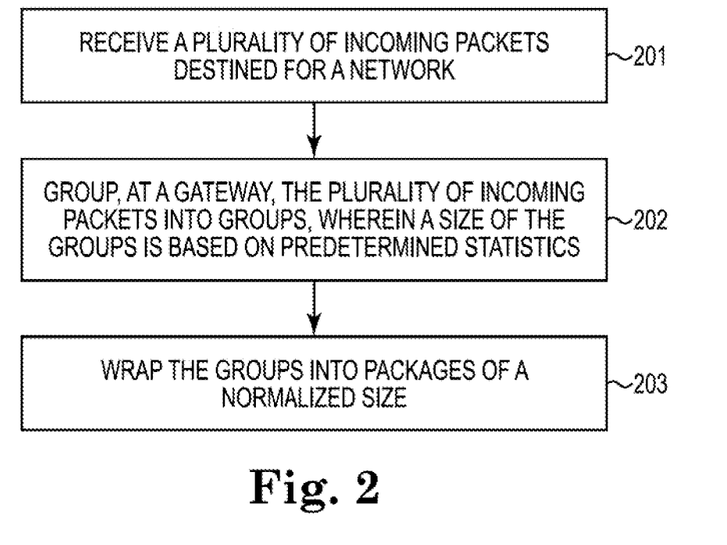
FIG. 2 is a flowchart illustrating an example method to group and wrap packets in a network.

FIG. 2 is a flowchart illustrating an example method 200 to group and wrap packets in a network, arranged in accordance with at least some embodiments of the present disclosure. The network may be a software defined network. Example method 200 may be implemented using, for example, any of the systems, such as system 500 (of FIG. 5), further described herein below. Example method 200 may include one or more operations, functions, or actions, as illustrated by one or more blocks 201, 202, and/or 203. In some embodiments, example method 200 may be performed by a computing device such as computing device 600 in FIG. 6. The operations described in blocks 201-203 may also be stored as computer-executable instructions in a computer-readable medium such as computer readable medium 706 as described in FIG. 7.

Example method 200 may begin with block 201 that recites "receive a plurality of incoming packets destined for a network." Block 201 may be followed by block 202, which recites "group, at a gateway, the plurality of incoming packets into groups, wherein a size of the groups is based on predetermined statistics." Block 202 may be followed by block 203, which recites, "wrap the groups into packages of a normalized size."

At block 201, a gateway (for example, normalizing gateway 504 in FIG. 5) may receive a plurality of incoming packets destined for a network (for example, attacker VM 501 and target VM 512 on server 509 in FIG. 5). The incoming packets may be, for example, incoming data related to email, commerce, or financial transactions. The network may include, for example, software-based controllers and network devices that may be programmed via an open interface. The open interface may be, for example, ForCES, OpenFlow, or another suitable interface. Alternately, the network may be implemented, for example, using such standards as Virtual Extensible Local Area Network (VXLAN), Network Virtualization using Generic Routing Encapsulation (NVGRE), or Stateless Transport Tunneling (STT).

At block 202, a packet aggregator system (such as packet aggregator system 505 at normalizing gateway 504 in FIG. 5) may group the incoming packets into groups. The size of the groups may be determined by predetermined statistics provided by a statistics system (for example, a target statistics system 507 in FIG. 5). The gateway of the network may be, for example, a network gateway by which outside computers communicate with servers or hypervisors within a data center. Packets may be held at the gateway and sorted by the intended destination of the packets for locations within the data center servers. These locations may include different virtual machines on a single server or multiple virtual machines on multiple servers. The packets may be grouped so that network traffic can be efficiently routed in a uniform fashion that will frustrate attempts to observe irregularities or patterns in network traffic. There may be multiple routing stops between the gateway and the final packet destinations, including core, aggregation, and edge datacenter routing stops. The predetermined statistics may be based, for example, on known network traffic statistical patterns.

At block 203 a wrapping system (for example, packet wrapper system 508 in FIG. 5) may wrap the groups into packages of a normalized size. A statistics system (for example, target statistics system 507 in FIG. 5) may provide the wrapping system with the normalized size for the wrapped packages. The normalized size may, for example, be based on the expected frequency or sizes of packets for distribution in the network, or may be based on other predetermined statistics. The normalized size may, for example, have a Gaussian profile, a Cauchy profile, Lorentz profile, Student profile, uniform profile, discrete profile, lookup-table profile, compound profile, or may have some other predetermined distribution profile, such as a lognormal distribution. Wrapping may, for example, be implemented through packet encapsulation. Packet encapsulation is the process of wrapping a packet of data in another format, where the format includes metadata and virtual switch metadata relating to virtual machine (VM) destination addresses, for example, Transmission Control Protocol (TCP), Internet Protocol (IP), Layer 2 Tunneling Protocol (L2), and/or Stateless Transport Tunneling (STT). A virtual machine manager (VMM) may maintain a table associated with each VM destination that indicates which VM destination addresses should be sent or linked to which physical addresses via the wrapped packages within the data center. Encapsulation or wrapping formats may in some cases be the same packet format as some or all of the wrapped packets.

Figure 3:
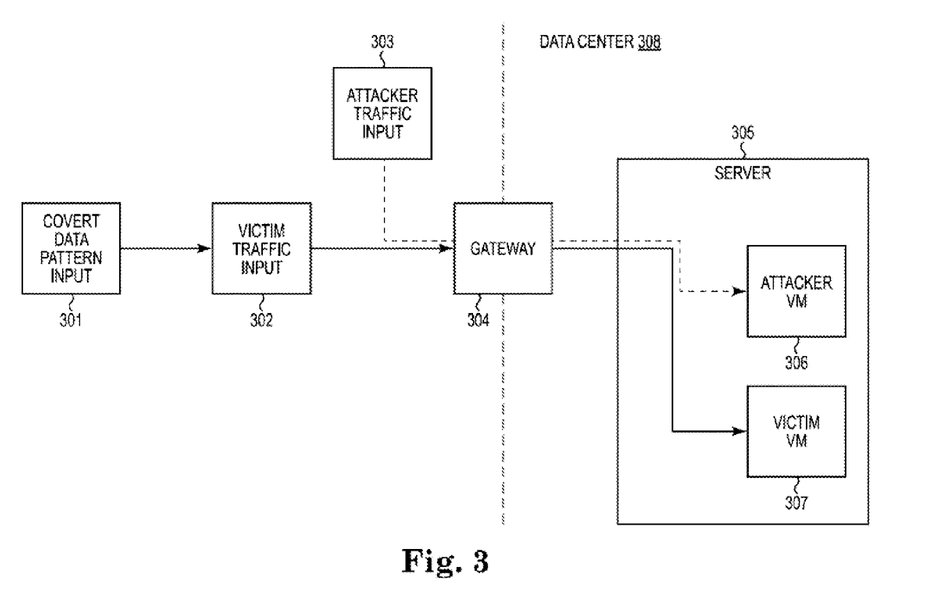
FIG. 3 illustrates an example system including a virtualized network undergoing a side channel attack.

FIG. 3 illustrates an example system 300 including a virtualized network undergoing a side channel attack, arranged in accordance with at least some embodiments of the present disclosure. FIG. 3 shows system 300, a covert data pattern input 301, a victim traffic input 302, an attacker traffic input 303, a gateway 304, a server 305, an attacker VM 306, a victim VM 307, and a data center 308. The various components described in FIG. 3 are merely examples, and other variations, including eliminating components, combining components, and substituting components are all contemplated.

FIG. 3 illustrates a side channel attack through a single shared link at gateway 304. Gateway 304 is the interface through which outside traffic interacts with server 305 located inside of data center 308. Traffic may be comprised of packets, each of which includes, for example, application data and a header. The header may contain information related to the intended destination of the packet, and may include destination address information that complies with such standards as TCP/IP and/or L2. An attacker may generate attacker traffic from attacker traffic input 303 with known patterns that will be statistically visible within the acceptable variance of packet delay for standard service level ranges that arrives at attacker VM 306. Because the attacker traffic shares the same pathway to server 305 as the victim traffic from victim data input 302 to victim VM 307, the attacker traffic will have statistical properties that reflect the properties of the victim traffic, for example due to queuing and congestion along the shared path. In this way, the attacker traffic from attacker traffic input 303 to attacker VM 306 may not appear to be unusual or statistically significant, and may appear to an outside observer as normal network traffic. Victim VM 307 may be one of an authentication server and a transaction server. Server 305 may include a hypervisor for managing VMs, for example such as attacker VM 306 and victim VM 307.

A covert data pattern may be inputted from covert data pattern input 301 and directed for input through gateway 304 to server 305 in data center 308. This covert data pattern may be composed, in some examples, of application programming interface (API) calls, or accurately timed e-commerce transaction submissions. The covert data may consist of known package sizes and/or a known timing. The attacker at attacker VM 306 may then use statistical covert channel detection in order to monitor delays in the attacker traffic originating from attacker traffic input 303 and arriving at attacker VM 306. By comparing the delays in the attacker traffic from attacker traffic input 303 with modulation in the covert data pattern from covert data pattern input 301, the attacker may be able to determine if attacker VM 306 is colocated with victim VM 307. The attacker may move attacker VM 306 around to different servers within data center 308 until VM colocation is determined. By moving the attacker VM 306 around to different servers within data center 308 and observing modulation on the covert pattern from covert data pattern input 301 and the traffic from attacker traffic input 303 to attacker VM 306, the attacker may be able to ascertain some level of cloud cartography of data center 308. Once colocation is determined, the attacker may use the observed modulation in the covert data pattern and the attacker traffic in order to time a side channel attack. For example, in a cache activity based side channel attack, the attacker may be able to determine activity patterns that correspond to a transaction being processed, and then use that pattern information to calibrate a cache based side channel attack. The side channel attack is successful because the attacker traffic and covert data pattern will share the same path as the victim traffic. Both the victim traffic and the attacker traffic will be routed through gateway 304 to server 305. Between gateway 304 and server 305, there may additionally be several layers of core, aggregation, and edge datacenter routing that both the victim and attacker traffic will also traverse.

Figure 4:
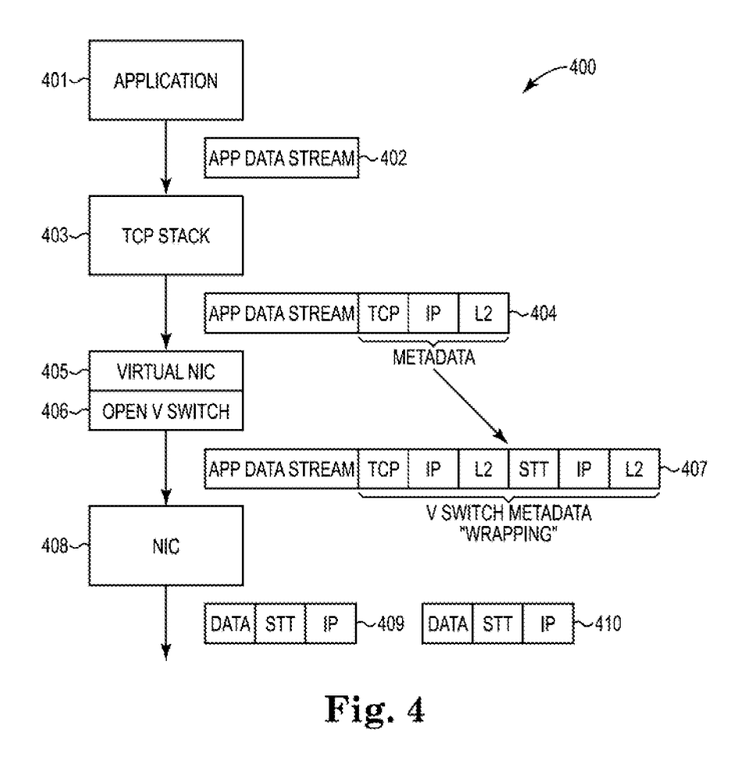
FIG. 4 illustrates a stack overview of virtualized networking for an application in a data center using packet encapsulation.

FIG. 4 illustrates a stack overview 400 of virtualized networking for an application in a data center using packet encapsulation, arranged in accordance with at least some embodiments of the present disclosure. FIG. 4 shows stack overview 400 including an application 401, an application data stream 402, a transmission control protocol (TCP) stack 403, a packet 404, a virtualized network interface controller (Virtual NIC) 405, an open virtualized switch (V switch) 406, a wrapped package 407, a network interface controller (NIC) 408, an unwrapped packet 409, and an unwrapped packet 410. The various components described in FIG. 4 are merely examples, and other variations, including eliminating components, combining components, and substituting components are all contemplated. For example, while FIG. 4 illustrates packet encapsulation according to the stateless transport tunneling (STT) standard, other network virtualization standards may be implemented including, but not limited to VXLAN or NVGRE.

Stack overview 400 as illustrated in FIG. 4 may correspond to the description of the victim and attacker traffic over the network in the data center described in FIG. 3. For example, application 401 may generate at least some of an application data stream 402. Application data stream 402 may be provided to TCP stack 403, which may generate metadata that allows application data stream 402 to be packetized into packet 404. The packet metadata may be a header that provides addresses for destinations within a data center. The packet metadata may include, for example, a TCP header, an internet protocol (IP) header, and a layer 2 tunneling protocol (L2) header. Packet 404 may be provided to virtual NIC 405 and open V switch 406. Virtual NIC 405 and open V switch 406 may correspond to the gateway described in FIG. 3. Virtual NIC 405 may then encapsulate packet 404 and wrap packet 404 with V switch metadata, thereby generating wrapped package 407. The V switch meta data of wrapped package 407 may include TCP, IP, and L2 headers, as well as an STT header. The V switch metadata may contain information that will direct wrapped package 407 to its destination within a data center. Open V switch 406 may then provide wrapped package 407 to NIC 408. NIC 408 may then unwrap wrapped package 407 in order to provide unwrapped packets 409 and 410 to their final destination in the network. This final destination may correspond to a victim VM or an attacker VM on the server such as victim VM 307 and attacker VM 306 as described in FIG. 3.

FIG. 5 illustrates an example system 500 including a network with side channel attack deterrence, arranged in accordance with at least some embodiments of the present disclosure. The network may be a software defined network. FIG. 5 shows system 500 as including covert data pattern input 501, a user traffic input 502, an attacker traffic input 503, normalizing gateway 504, packet aggregator system 505, a change system 506, target statistics system 507, packet wrapper system 508, server 509, attacker VM 510, an unwrapper system target VM 512, and data center 513. The various components described in FIG. 5 are merely examples, and other variations, including eliminating components, combining components, and substituting components are all contemplated.

FIG. 5 illustrates a system for deterring an attempted side channel attack through a single shared link at normalizing gateway 504. Normalizing gateway 504 is the interface through which outside traffic interacts with a server 509 located inside of data center 513. An attacker may generate attacker traffic from attacker traffic input 503 with known patterns that will be statistically visible within the acceptable variance of packet delay for standard service level ranges that arrives at attacker VM 510. The attacker may also input a covert data pattern from covert data pattern input 501. This covert data pattern may, in some examples, be composed of application programming interface (API) calls, or accurately timed e-commerce transaction submissions. The covert data may consist of known package sizes at a known timing. The covert data pattern from covert data pattern input 501, attacker traffic from attacker traffic input 503, as well as a user traffic from user traffic input 502 may all arrive at normalizing gateway 504, which may provide an access point to servers within data center 513, including server 509.

The covert data pattern from covert data pattern input 501, the user traffic from user traffic input 502, and the attacker traffic from attacker traffic input 503 may all be received by packet aggregator system 505 located in normalizing gateway 504. Packet aggregator system 505 may then sort the outside traffic based on the destination contained in the traffic's packet headers and may aggregate at least some of these packets into groups based on these destinations. For example, packet aggregator system 505 may collect together multiple packets destined for a same server, such as server 509. Alternately, packet aggregator system 505 may fracture very large packets into multiple packets destined for a server, for example server 509. Target statistics may be provided by target statistics system 507 that may instruct packet aggregator system 505 as to what size the groups of packets should be based upon acceptable levels of delay and data center service levels. The groups of packets may then be provided to packet wrapper system 508, which may then wrap the groups of packets into packages. These packages may include headers that contain metadata related to the destination of the groups of packets. This metadata may include, for example, TCP, IP, and/or L2 headers, as well as an STT header. The groups of packets may include multiple packets, split packets, single packets, redundant data, and/or false data. Packet wrapper system 508 may wrap the groups of packets into packages of a normalized size. The normalized size of the packages may be provided by target statistics system 507. The normalized size may be chosen in order to obscure packet size information, and may be based on a Gaussian distribution. The normalized size may also be selected such that the normalized size varies over time. Target statistics system 507 may be controlled by change system 506. Change system 506 may provide instructions to target statistics system 507 such that change the statistics supplied to packet aggregator system 505 and packet wrapper system 508. The target statistics may vary with the level of busyness of the network to increase entropy in observed network flow. For example, the distribution of normalized sizes may vary according to a busyness of the traffic on the network. In this case, the target statistics may make the observable network traffic appear more busy in times of lower demand for data center server access. Change system 506 may be controlled from within data center 513. Alternately, change system 506 may be controlled remotely, for example, by a network administrator.

Packet wrapper system 508 may provide the wrapped packages to destinations on servers within data center 513, for example server 509. Server 509 may host a plurality of VMs, for example attacker VM 510 and target VM 512. Target VM 512 may be, for example, one of a transaction server and authentication server. Target VM 512 may be in communication with unwrapper system 511. In operation, unwrapper system 511 may receive wrapped packages provided by packet wrapper system 508. Unwrapper system may unwrap the wrapped packages into separate packets without the need for any application recoding. Unwrapper system 511 may be implemented in a virtual router associated with server 509 or a hypervisor running on server 509. Unwrapper system 511 is shown unwrapping packets only for target VM 512 but in some alternatives the unwrapper 511 may unwrap data that is meant for multiple receivers including at least one non-attacker VM 510, the receivers may include the attacker VM 510.

In the arrangement as described in FIG. 5, the attacker will still be able to obtain statistical data from the shared router path between attacker VM 510 and target VM 512. However, because all incoming packets have been wrapped and normalized by normalizing gateway 504, including packets associated with the covert data pattern input at covert data pattern input 501, the statistical data that the attacker obtains may match the target statistics provided by target statistics system 507. Because the target statistics provided by target statistics system 507 may normalize both the size and flow of observable network traffic, the covert data pattern may be subsumed at the normalizing gateway into the wrapped packages, and may prevent the attacker from discerning any meaningful information about the target VM 512 or the cartography of server 509 or data center 513.

Figure 6:
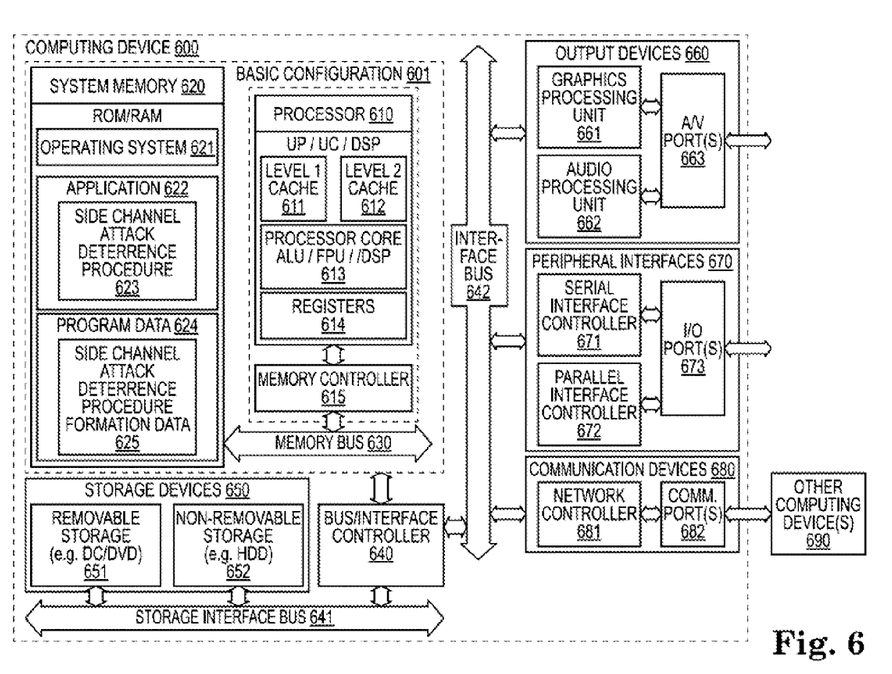
FIG. 6 is a block diagram illustrating an example computing device that is arranged for controlling a network.

FIG. 6 is a block diagram illustrating example computing device 600 that is arranged for controlling a network, arranged in accordance with at least some embodiments of the present disclosure. In a very basic configuration 601, computing device 600 typically includes one or more processors 610 and system memory 620. A memory bus 630 may be used for communicating between the processor 610 and the system memory 620.

Depending on the desired configuration, processor 610 may be of any type including but not limited to a microprocessor (µP), a microcontroller (µC), a digital signal processor (DSP), or any combination thereof. Processor 610 may include one more levels of caching, such as a level one cache 611 and a level two cache 612, a processor core 613, and registers 614. An example processor core 613 may include an arithmetic logic unit (ALU), a floating point unit (FPU), a digital signal processing core (DSP Core), or any combination thereof. An example memory controller 615 may also be used with the processor 610, or in some implementations the memory controller 615 may be an internal part of the processor 610.

Depending on the desired configuration, the system memory 620 may be of any type including but not limited to volatile memory (such as RAM), non-volatile memory (such as ROM, flash memory, etc.) or any combination thereof. System memory 620 may include an operating system 621, one or more applications 622, and program data 624. Application 622 may include a side channel attack deterrence procedure 623 that is arranged to form a system for side channel attack deterrence as described herein. Program data 624 may include side channel attack deterrence system formation data 625, and/or other information useful for the implementation of the side channel attack deterrence procedure as described herein. In some embodiments, application 622 may be arranged to operate with program data 624 on an operating system 621 such that any of the procedures described herein may be performed. This described basic configuration is illustrated in FIG. 6 by those components within dashed line of the basic configuration 601.

Computing device 600 may have additional features or functionality, and additional interfaces to facilitate communications between the basic configuration 601 and any required devices and interfaces. For example, a bus/interface controller 640 may be used to facilitate communications between the basic configuration 601 and one or more storage devices 650 via a storage interface bus 641. The storage devices 650 may be removable storage devices 651, non-removable storage devices 652, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 620, removable storage 651 and non-removable storage 652 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 642 for facilitating communication from various interface devices (e.g., output interfaces, peripheral interfaces, and communication interfaces) to the basic configuration 601 via the bus/interface controller 640. Example output devices 660 include a graphics processing unit 661 and an audio processing unit 662, which may be configured to communicate to various external devices such as a display or speakers via one or more A/V ports 663. Example peripheral interfaces 670 include a serial interface controller 671 or a parallel interface controller 672, which may be configured to communicate with external devices such as input devices (e.g., keyboard, mouse, pen, voice input device, touch input device, etc.) or other peripheral devices (e.g., printer, scanner, etc.) via one or more I/O ports 673. An example communication device 680 includes a network controller 681, which may be arranged to facilitate communications with one or more other computing devices 690 over a network communication link via one or more communication ports 682.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configurations.

Figure 7:
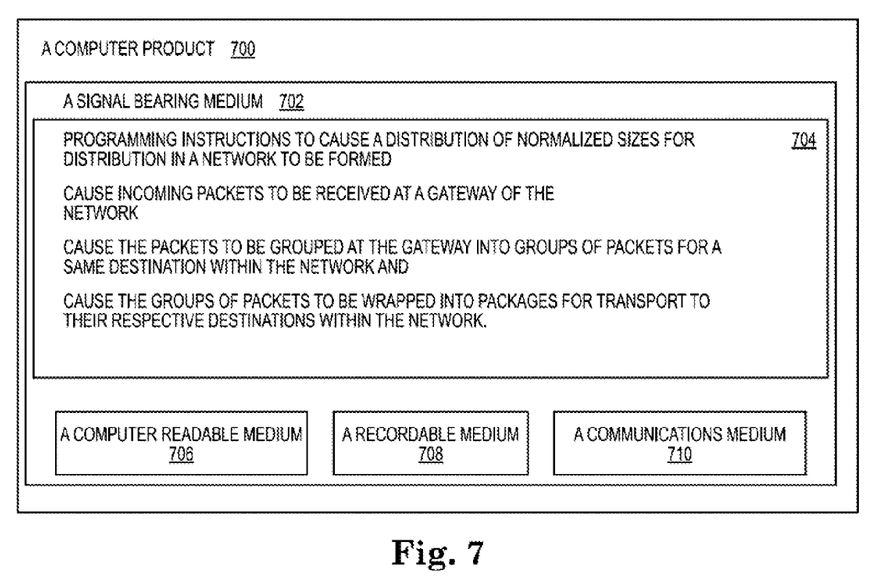
FIG. 7 is a block diagram illustrating an example computer program product that is arranged to store instructions for forming a system to prevent a side channel attack.

FIG. 7 is a block diagram illustrating an example computer program product 700 that is arranged to store instructions for forming a system for side channel attack deterrence, arranged in accordance with at least some embodiments of the present disclosure. The signal bearing medium 702 which may be implemented as or include computer-readable medium 706, a computer recordable medium 708, a computer communications medium 710, or combinations thereof, stores programming instructions 704 that may configure the processing unit to perform all or some of the processes previously described. These instructions may include, for example, one or more executable instructions for forming a system for deterring side channel attacks on a network. This may include causing a distribution of normalized sizes for distribution in the network to be formed. These executable instructions may further cause incoming packets to be received at a gateway of the network. The executable instructions may also cause the packets to be grouped at the gateway into groups of packets for a same destination within the network. The executable instructions may also cause the groups of packets to be wrapped into packages for transport to their respective destinations within the network.

The present disclosure is not to be limited in terms of the particular examples described in this application, which are intended as illustrations of various aspects. Many modifications and examples can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and examples are intended to fall within the scope of the appended claims. The present disclosure includes the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular examples only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 items refers to groups having 1, 2, or 3 items. Similarly, a group having 1-5 items refers to groups having 1, 2, 3, 4, or 5 items, and so forth.

While the foregoing detailed description has set forth various examples of the devices and/or methods via the use of block diagrams, flowcharts, and/or examples, such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one example, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the examples disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. For example, if a user determines that speed and accuracy are paramount, the user may opt for a mainly hardware and/or firmware vehicle; if flexibility is paramount, the user may opt for a mainly software implementation; or, yet again alternatively, the user may opt for some combination of hardware, software, and/or firmware.

In addition, those skilled in the art will appreciate that the mechanisms of the subject matter described herein are capable of being distributed as a program product in a variety of forms, and that an illustrative example of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or methods in the fashion set forth herein, and thereafter use engineering practices to integrate such described devices and/or methods into data processing systems. That is, at least a portion of the devices and/or methods described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While various aspects and examples have been disclosed herein, other aspects and examples will be apparent to those skilled in the art. The various aspects and examples disclosed herein are for purposes of illustration and are not intended to be limiting, with the true scope and spirit being indicated by the following claims.

What is claimed is:

1. An apparatus to prevent attack on a network by a potential attacker, the apparatus comprising:
    at least one processor;
    at least one non-transitory computer readable medium coupled to the at least one processor, the at least one non-transitory computer readable medium encoded with instructions that are executable by the at least one processor to:

obtain a plurality of incoming packets configured to be routed to a target virtual machine (VM) within the network;

identify a packet size for each of the plurality of incoming packets;

obtain target statistics that include information to aggregate at least some of the plurality of incoming packets into groups, wherein the information to aggregate the at least some of the plurality of incoming packets into the groups is based on: acceptable delays in distribution of the plurality of incoming packets, and service levels associated with the network;

aggregate the at least some of the plurality of incoming packets into the groups, based on the obtained target statistics;

determine, based on the identified packet size for each of the plurality of incoming packets, a normalized size for the groups, wherein the normalized size varies over time, and wherein the normalized size is selected to prevent information regarding the packet size for each of the plurality of incoming packets from being discerned by the potential attacker; and wrap the groups into one or more wrapped packages of the normalized size such that statistic data, associated with a shared router path between an attacker VM and the target VM and received by the potential attacker during distribution of the one or more wrapped packages, matches with the target statistics.

2. The apparatus of claim 1, wherein the normalized size is determined in accordance with the target statistics.

3. The apparatus of claim 1, wherein the target statistics are adjusted based on a busyness of the network.

4. The apparatus of claim 1, wherein the target statistics vary over time.

5. The apparatus of claim 1, wherein the target statistics are configured to change a distribution of the normalized size.

6. The apparatus of claim 1, wherein the target statistics are adjusted from within a data center that hosts the network.

7. The apparatus of claim 1, wherein the target statistics are selected to increase entropy in packet flow to the network.

8. The apparatus of claim 1, wherein the groups comprise one or more of multiple packets, split packets, single packets, redundant data, or false data.

9. The apparatus of claim 1, wherein observable traffic on the network comprises a normalized distribution of wrapped packets of the normalized size.

10. The apparatus of claim 1, wherein the network comprises a software defined network.

11. A method to prevent an attack by a potential attacker on a network, the method comprising:

receiving a plurality of incoming packets destined for distribution to a target virtual machine (VM) within the network;

identifying a packet size for each of the plurality of incoming packets;

obtaining target statistics that include information to group the plurality of incoming packets into one or more groups, wherein the information to group the plurality of incoming packets into the one or more groups is based on: acceptable delays in distribution of the plurality of incoming packets, and service levels associated with the network;

grouping, at a gateway, the plurality of incoming packets into the one or more groups, based on the obtained target statistics; and wrapping the one or more groups into one or more packages of a normalized size, wherein the normalized size is determined based on the identified packet size for each of the plurality of incoming packets, and wherein the one or more groups are wrapped into the one or more packages of the normalized size such that statistic data, associated with a shared router path between an attacker VM and the target VM and received by the potential attacker during distribution of the one or more packages, matches with the target statistics.

12. The method of claim 11, wherein wrapping the one or more groups into the one or more packages of the normalized size includes wrapping the one or more groups into one or more packages of a normalized size that varies over time.

13. The method of claim 11, wherein grouping the plurality of incoming packets into the one or more groups includes grouping the plurality of incoming packets into one or more groups that include multiple packets, split packets, single packets, false data, or combinations thereof.

14. The method of claim 11, wherein individual packets in each of the one or more groups are destined for a same destination.

15. The method of claim 11, wherein receiving the plurality of incoming packets destined for the distribution to the target VM within the network comprises receiving incoming packets destined for distribution to one or more target VMs within a software defined network.

16. An apparatus, comprising:

at least one processor;

at least one non-transitory computer readable medium coupled to the at least one processor and encoded with executable instructions that are executable by the at least one processor to:

obtain one or more wrapped packages to be distributed to a target virtual machine (VM) within a network, wherein each of the one or more wrapped packages comprises a group of packets, wherein the packets are grouped based on target statistics that include information to group the packets into one or more groups, and wherein the information to group the packets into the one or more groups is based on: acceptable delays in distribution of the packets, and service levels associated with the network; and distribute the one or more wrapped packages to the target VM within the network, such that statistic data, associated with a shared router path between an attacker VM and the target VM and received by a potential attacker during distribution of the one or more wrapped packages, matches with the target statistics.

17. The apparatus of claim 16, wherein the apparatus includes a virtual router associated with a hypervisor.

18. The apparatus of claim 17, wherein the one or more wrapped packages comprise one or more of multiple packets, split packets, single packets, or false data.

19. A method to deter attack by a potential attacker in a network, the method comprising:

receiving incoming packets at a gateway of the network;

identifying a packet size for each of the incoming packets;

obtaining target statistics that include information to group the incoming packets into one or more groups of packets, wherein the information to group the incoming packets into the one or more groups of packets is based on: acceptable delays in distribution of the incoming packets, and service levels associated with the network;

grouping, at the gateway and based on the obtained target statistics, the incoming packets into the one or more groups of packets for a same destination, wherein the one or more groups of packets are sized in accordance with normalized sizes that are determined based on the identified packet size for each of the incoming packets and are selected to prevent information regarding the packet size for each of the received incoming packets from being discerned by the potential attacker; and wrapping, at the gateway, the one or more groups of packets into one or more packages in preparation for transport to a target virtual machine (VM) within the network, wherein the one or more groups of packets are wrapped such that statistic data, associated with a shared router path between an attacker VM and the target VM and received by the potential attacker during the transportation of the one or more packages, matches with the target statistics.

20. The method of claim 19, further comprising varying distribution of the normalized sizes in accordance with a busyness of the network.

\* \* \* \* \*